June 13, 1967 L. H. HIGBY 3,325,185
SAFETY RING ATTACHMENT FOR SEMI-TRAILER FIFTH WHEEL
Filed June 10, 1965 2 Sheets-Sheet 2
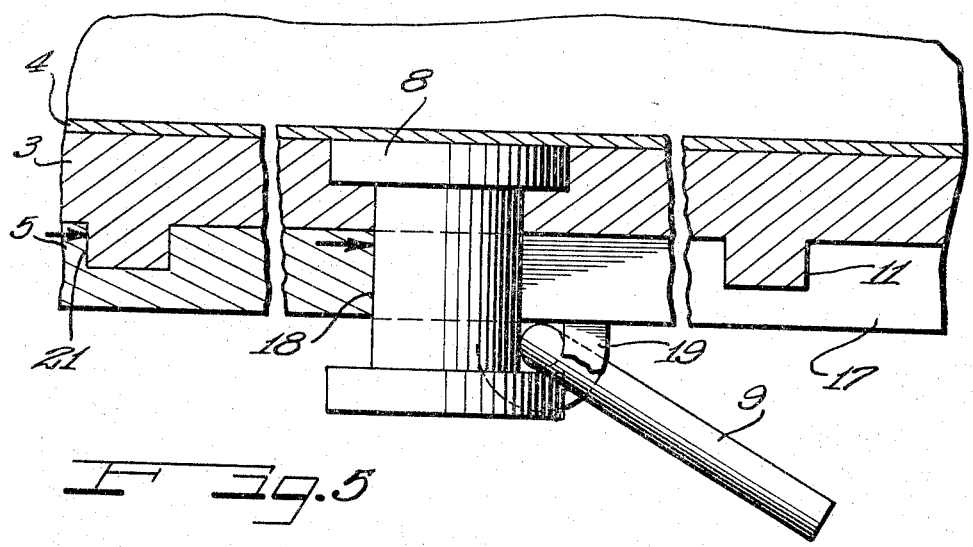
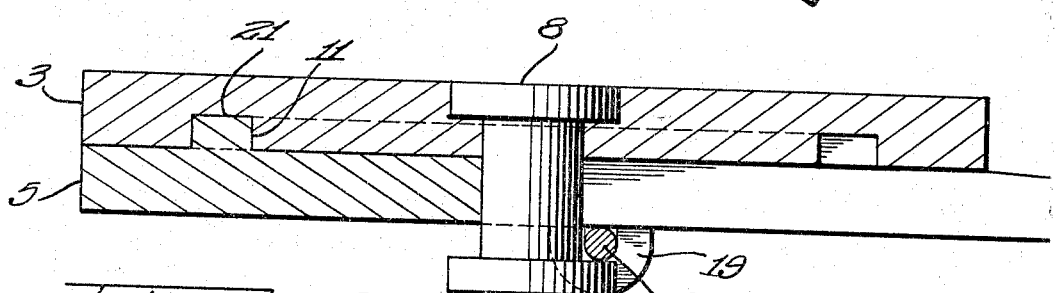
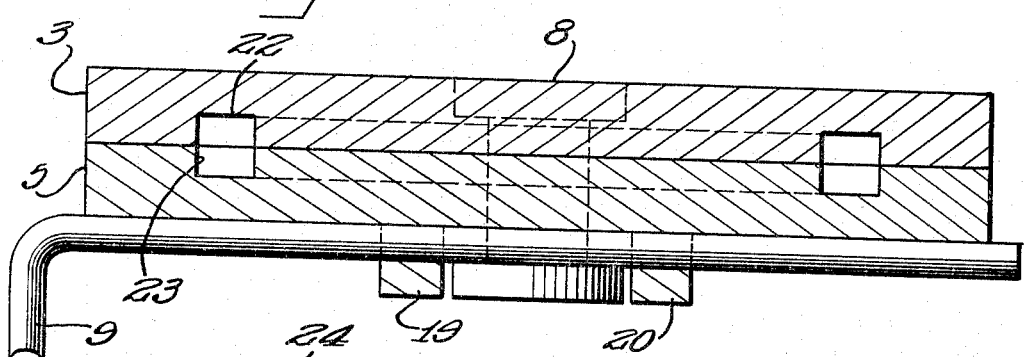
INVENTOR.
Lawrence H. Higby
BY Hill, Sherman, Meroni, Gross Simpson ATTORNEYS

United States Patent Office 3,325,185
Patented June 13, 1967

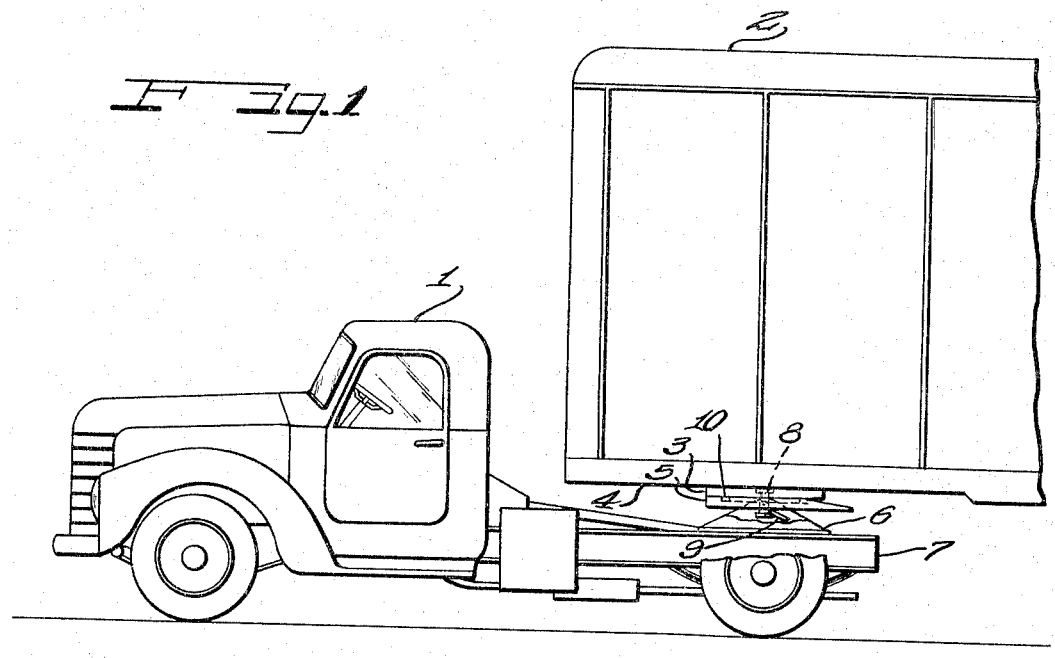

3,325,185
SAFETY RING ATTACHMENT FOR SEMI-TRAILER
FIFTH WHEEL
Lawrence H. Higby, Box 49, Lyons Valley Rte.,
Lander, Wyo. 82520
Filed June 10, 1965, Ser. No. 462,799
1 Claim. (Cl. 280—432)

This invention relates to a fifth wheel assembly for attaching a semi-trailer to a prime mover and in particular to a safety ring attachment adaptable to a standard fifth wheel assembly.

Increases in engine horsepower and in trailer size have substantially increased the capacity of the trucking industry for transporting heavier loads at higher speeds. However, this increased capacity has generated new strucutral deficiencies in the vehicle itself which presents important safety problems to the trucking system.

This invention focuses on one such safety problem and in particular on the means for coupling the semi-trailer to the prime mover.

Currently, semi-trailers are coupled to the prime mover solely through the use of a king pin which is fundamentally a hardened steel shaft extending from the lower face of a skid plate disposed at the underside of the trailer body. This king pin is received by a socket formed centrally within a saddle plate which is mounted directly to the prime mover. The combined assembly including the two plates and connecting king pin is commonly referred to as a semi-trailer fifth wheel.

The principal safety problem posed by this connection rests in the requirement that the king pin must sustain the entire inertial loads associated with acceleration or deceleration of the vehicle as would be encountered during stopping, starting and turning movements. For modern load and speed requirements, standard king pins tend to offer inadequate protection as evidenced by the increasingly strict inspection requirements of state regulatory agencies.

Therefore, it is an object of this invention to provide a novel semi-trailer fifth wheel assembly capable of more safely sustaining increased trailer loads at higher speeds.

It is also an object of this invention to provide a fifth wheel assembly utilizing an annular groove and an annular lip for forming secondary coupling surfaces concentric with the coupling surfaces associated with a standard king pin and socket.

It is another object of this invention to provide a fifth wheel safety adapter which may be readily utilized in present semi-trailer coupling designs.

It is a further object of this invention to provide adapter plates for upper and lower fifth wheel sections having annular grooves thereon and having a readily removable safety ring disposed therein for providing a novel coupling surface.

These and other objects, features and advantages of the present invention will be understood in greater detail from the following description and the associated drawings wherein reference numerals are utilized in designating a preferred embodiment and wherein:

FIGURE 1 shows a working environment for the fifth wheel assembly of this invention and illustrates generally the coupling of a truck cab and semi-trailer;

FIGURE 2 is an elevational view of the lower surface of the upper fifth wheel assembly according to this invention;

FIGURE 3 is an elevational view of the upper face of the lower fifth wheel section which is designed to be cooperable with the features illustrated in FIGURE 2;

FIGURE 4 is a sectional view of the fifth wheel assembly utilized in the working environment of FIGURE 1 and taken along the lines IV—IV of the corresponding element in FIGURE 3;

FIGURE 5 is a sectional view similar to that shown in FIGURE 4 for illustrating an alternate embodiment;

FIGURE 6 is a cross sectional view of the assembly illustrated in FIGURE 1 and is taken along lines in quadrature with the views of FIGURES 4 and 5; and FIGURE 7 is a partial view of the example shown in FIGURE 6 for illustrating a functional aspect of that embodiment.

To overcome the high degree of dependence of current trailer truck couplings on the shear strength of the main king pin, this invention provides an additional coupling surface. This secondary coupling surface is provided in the form of cooperable faces formed with the lower and upper half sections of the fifth wheel assembly. A preferred embodiment of this invention is shown in FIGURES 2 and 3 and comprises generally an upper fifth wheel section having an annular lip disposed outwardly and concentrallly of the depending king pin. To form the secondary coupling of this invention, the lower half fifth wheel section is provided with an annular groove formed outwardly and concentrically of the king pin socket. When these two sections are joined as in the working environment of FIGURE 1, the secondary coupling is found in that the annular lip rides within its complementary groove during turning movements of the cab-trailer assembly.

It is apparent from FIGURE 1 that this secondary coupling surface will provide a significant supplementary means for absorbing inertial loads associated with acceleration and deceleration. In fact, the shear strength of the annular lip in conjunction with its associated groove can be made to substantially exceed that of the king pin itself. This is due to the relatively small coupling area associated with the king pin and the comparatively large coupling area of the concentric lip. It is clear, therefore, that if the per unit strength of the two coupling provisions is identical, the annular lip will sustain inertial loads exceeding that of the king pin by the ratio of their respective areas.

Referring to FIGURES 1, 2 and 3 in greater detail, it can be seen in FIGURE 1 that a cab 1 is coupled to a semi-trailer 2 through a fifth wheel assembly meeting the specifications of this invention. The fifth wheel assembly comprises an upper plate 3 which is rigidly secured to the supporting frame 4 of the semi-trailer 2. A lower fifth wheel plate 5 is pivotally mounted at an elevated support 6 which in turn is fixedly secured to the rearwardly extending cab frame 7.

The upper plate 3 is commonly referred to as a skid plate and has a principal king pin 8 fixedly mounted therein and depending below the lower surface thereof. The lower plate 5 may be referred to as a saddle plate and has a socket formed centrally therein for receiving the king pin 8. More specifically, this socket is formed as the innermost point of an elongated slot extending rearward of the plate 5 and having tapered side walls as can be readily seen in FIGURE 3. Once the king pin 8 is positioned within the cooperable socket, a locking rod 9 is utilized to maintain the coupling.

The secondary coupling surface provided by this invention is indicated in FIGURE 1 by the reference numeral 10 and is illustrated in FIGURES 2 and 3 in enlarged and unobstructed elevated views. In FIGURE 2, the upper or skid plate 3 is shown as a circular disk having a king pin 8 depending centrally therefrom. Also, an annular lip 11 is formed outwardly of the king pin 8. The lip 11 is also depending from the skid surface 12 and is disposed for being concentric with the pin 8 for permitting rotation of the plate 3 about a common center.

The lower half section of the fifth wheel assembly as employed in FIGURE 1, is shown in an elevated view of FIGURE 3 as comprising generally the saddle plate 5. The plate 5 is provided with guide legs 13 and 14 having inwardly tapered faces 15 and 16. The faces 15 and 16 lead to an elongated slot 17 and terminate in the principal king pin socket 18. Here, the king pin 8 is shown disposed within the socket 18 and maintained in cooperation therewith by the locking rod 9 which is slidably received by supporting fixtures 19 and 20. Important here is the fact that the saddle plate 5 is provided with an annular groove 21 formed outwardly of and concentrically with the principal socket 18. The groove 21 is designed for complementarily receiving the depending lip 11 to accomplish the secondary coupling which is the focus of this invention.

The coupling of the trailer and cab units having a fifth wheel assembly as shown in FIGURES 2 and 3 can be accomplished in the standard manner. Principally, the semitrailer 2 would be supported by a jack or other lifting mechanism when not in use, and the coupling to the cab 1 would be achieved by guiding the lower fifth wheel section which is mounted to the cab structure into engagement with the king pin depending from the upper skid plate. When the king pin 8 is securely engaged within the socket 18, the upper lip 11 will likewise be aligned with the cooperable groove 21 such that disengaging the lifting mechanism will lower the upper plate 3 for providing the necessary union of the complementary surfaces as shown at 10 in FIGURE 1.

FIGURE 4 is a cross sectional view of the fifth wheel assembly of this invention taken along the lines IV—IV of FIGURE 3. Here the skid plate 3 is shown rigidly secured to the semi-trailer frame 4, and the king pin 8 is shown depending from the plate 3 in the standard manner. The pin 8 has been received within the elongated slot 17 and is locked into position by the rod 9 which is received within the supporting fixture 19. Principal to this view is the provision for the annular slot 21 and the depending lip 11 both of which are formed concentrically of the main socket 18 and the king pin 8.

From the arrows shown in this FIGURE 4, the manner in which the secondary coupling aids the king pin 8 in absorbing inertial forces generated between the upper and lower fifth wheel sections can be readily seen. For instance, consider that the brakes have been applied at a high speed and that the semi-trailer is appreciably loaded which is usually the case due to present day cost-mindedness. The result is that the semi-trailer and, hence the upper plate 3 will experience a forwardly directed force relative to the lower plate 5 which is fixedly secured to the cab. Heretofore, such thrusts were absorbed entirely at the king pin 8, while in the present invention, this force is distributed between the pin 8 and the expanded surface of the depending lip 11. It should be noted that the cooperable surfaces intermediate the lip 11 and the slot 21 may be highly machined to provide a bearing surface or may be roughly machined such that the respective surfaces will not contact under normal conditions. In the latter circumstance the lip 11 would be received loosely within the slot 21 to act entirely as a safety device in case of total failure of the king pin 8. In both instances, the lip 11 acts to increase the safety of the trailer connection.

FIGURE 5 shows an alternate form of this invention wherein the lip 11 extends from the lower or saddle plate 5, and the complementary annular slot 21 is formed within the upper or skid plate 3. When assembled, the cooperation is identical to that described in FIGURE 4; the particular embodiment chosen may be dictated by such factors as the type of locking mechanism to be employed or the like.

FIGURE 6 illustrates another embodiment of this invention wherein both the upper and lower plates have annular slots 22 and 23 formed concentrically of the main king pin 8 for being radially aligned. In this example, the secondary coupling is provided by inserting a complementary safety ring 24 within the gap formed intermediate the slots 22 and 23. The ring 24, for example, may be positioned within the upper slot 22 by suitable fixtures such as a plurality of recessed screws such that the net result is similar to the embodiment shown in FIGURES 2 and 3. There, the depending lip was formed integrally with the upper plate 3 and was received within the lower slot 21 during coupling. Or, in the alternative, the safety ring 24 may be fixedly mounted within the lower slot 23 for approximating the embodiment as shown in FIGURE 5.

The advantage of having the ring removable rather than formed integrally with the fifth wheel sections, will derive from the particular needs of the trucker involved. In particular, the safety ring 24 may be reserved solely for exceptionally heavy loads in cases where the trucker's principal business involves transporting low density-lightweight goods, but whose occasional operation involves transporting heavier items. Providing a movable secondary coupling surface under such circumstances may obviate the need for repeated use of any supplemental equipment involved in coupling the fifth wheel assembly of this invention.

In addition, the use of a removable ring will permit a gradual transition from current systems to fifth wheel assemblies employing the features of this invention. This is possible because the upper and lower fifth wheel plates may be constructed for receiving a safety ring but may be temporarily operated in the conventional manner until all systems have been altered accordingly.

It will be understood that various modifications may be suggested by the embodiment disclosed, but I desire to claim within the scope of the patent warranted hereon all such modifications as come within the scope of my invention.

I claim as my invention:

In a semi-trailer for attachment to a prime mover, a fifth wheel assembly comprising:

a lower fifth wheel section mounted at said prime mover and having an upper skid plate, an upper fifth wheel section mounted at said semi-trailer and having a lower skid plate, a king pin depending from the upper fifth wheel section and a bore formed centrally of the lower fifth wheel section, a guide slot extending radially outwardly from the bore for guiding the king pin into the bore, at least one of said skid plates having a circular groove formed radially outwardly of the center of the plate and extending continuously around the center of the plate for an angle of at least 360° less the angle occupied by said guide slot, said groove penetrating to a depth within the associated plate which depth is less than the thickness of the plate, and the other of said skid plates having a circular rib fixedly protruding therefrom and extending continuously around the center thereof for an angle of at least 360° less the angle occupied by said guide slot.

References Cited

UNITED STATES PATENTS

| 2,258,076 | 10/1950 | Plaxco | 280—432 |
| 2,673,747 | 3/1954 | Norris | 280—432 |
| 2,676,817 | 4/1954 | White. | |
| 2,959,429 | 11/1960 | Lavelle | 280—432 |

FOREIGN PATENTS

| 1,078,082 | 5/1954 | France. |
| 1,100,950 | 4/1954 | France. |

LEO FRIAGLIA, *Primary Examiner.*